US012663657B2

(12) United States Patent
Chien et al.

(10) Patent No.: US 12,663,657 B2
(45) Date of Patent: Jun. 23, 2026

(54) LIGHT SOURCE MODULE

(71) Applicant: Qisda Corporation, Taoyuan City (TW)

(72) Inventors: Chih-Shiung Chien, Taoyuan City (TW); Ming-Kuen Lin, Taoyuan City (TW); Tsung-Hsun Wu, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 410 days.

(21) Appl. No.: 18/413,054

(22) Filed: Jan. 16, 2024

(65) Prior Publication Data

US 2024/0272445 A1 Aug. 15, 2024

(30) Foreign Application Priority Data

Feb. 13, 2023 (CN) .......................... 202310105959.0

(51) Int. Cl.
*G02B 27/10* (2006.01)
*H04N 9/31* (2006.01)
(52) U.S. Cl.
CPC ......... *G02B 27/102* (2013.01); *H04N 9/3161* (2013.01)
(58) Field of Classification Search
CPC .... G03B 21/28; G03B 21/145; G03B 21/208; G03B 21/2013; G03B 21/2033; H04N 9/31; H04N 9/317; H04N 9/3102; H04N 9/3105; H04N 9/3141; H04N 9/3161; H04N 9/3164; G02B 27/0037; G02B 27/0056; G02B 27/0101; G02B 27/0114; G02B 27/013; G02B 27/102; G02B 27/141

See application file for complete search history.

(56) References Cited

U.S. PATENT DOCUMENTS

| | | | | |
|---|---|---|---|---|
| 2019/0391472 A1* | 12/2019 | Akiyama | ............. | G03B 21/204 |
| 2022/0066305 A1* | 3/2022 | Akagawa | ........... | G03B 21/2033 |
| 2023/0418144 A1* | 12/2023 | Takagi | ................. | H04N 9/3161 |

* cited by examiner

*Primary Examiner* — Sultan Chowdhury
(74) *Attorney, Agent, or Firm* — JCIPRNET

(57) ABSTRACT

A light source module includes a laser light source, first and second dichroic mirrors, a focusing lens, a diffuser module, a light combining element, a reflector, and a diffuser. The laser light source emits a first color light and a second color light along a first direction. The focusing lens includes a first portion and a second portion arranged in the first direction. The first portion is disposed between the diffuser module and the first dichroic mirror, and the second portion is disposed between the diffuser module and the second dichroic mirror. The second dichroic mirror is disposed between the second portion and the light combining element, and the light combining element reflects at least a portion of the first color light and allows at least a portion of the second color light to pass through. The first dichroic mirror is disposed between the first portion and the reflector.

17 Claims, 7 Drawing Sheets

LIGHT SOURCE MODULE

CROSS-REFERENCE TO RELATED APPLICATION

This application claims the priority benefit of China application serial no. 202310105959.0, filed on Feb. 13, 2023. The entirety of the above-mentioned patent application is hereby incorporated by reference herein and made a part of this specification.

BACKGROUND

Technical Field

The disclosure relates to a light source module, and in particular to a light source module applicable to a projection device.

Description of Related Art

Generally speaking, a common laser projection equipment adopts the configuration of a light combining module to generate a multi-color laser beam for subsequent projection and imaging. In current applications, in order to further reduce the volume of a laser light source, the common design is to package red, green, and blue laser diodes in a plurality of rows side by side into a single multi-color laser diode light source module, so as to achieve the purpose of a light combining module that can simultaneously provide red, green, and blue light to the laser projection equipment.

However, since the above packaging design usually only sequentially arranges the red, green, and blue laser diodes in a plurality of rows (for example, a plurality of red laser diodes are sequentially arranged in a row separately, and a plurality of green and blue laser diodes are sequentially arranged in another row), color unevenness in an image projected by the laser projection equipment (for example, the upper half portion of the projected image is greenish in color and the lower half portion is bluer) is caused, along with the phenomenon of light spots blinking and flickering caused by high coherence of the laser beam, resulting in poor image projection quality of the laser projection equipment.

SUMMARY

The disclosure provides a light source module, which helps improve the problem of uneven color or light spots.

A light source module of the disclosure includes a laser light source, a first dichroic mirror, a second dichroic mirror, a focusing lens, a diffuser module, a light combining element, a reflector, and a diffuser. The laser light source emits a first color light and a second color light along a first direction, and the first color light and the second color light are arranged in a second direction. The first dichroic mirror is disposed corresponding to the first color light to reflect the first color light, in which the first dichroic mirror allows the second color light to pass through. The second dichroic mirror is staggered with the first dichroic mirror in the second direction and disposed corresponding to the second color light to reflect the second color light, in which the second dichroic mirror allows the first color light to pass through. The focusing lens includes a first portion and a second portion arranged in the first direction, in which the first portion is disposed corresponding to the first dichroic mirror, and the second portion is disposed corresponding to the second dichroic mirror. The first portion is disposed between the diffuser module and the first dichroic mirror, and the second portion is disposed between the diffuser module and the second dichroic mirror. The second dichroic mirror is disposed between the second portion and the light combining element, and the light combining element reflects at least a portion of the first color light and allows at least a portion of the second color light to pass through. The first dichroic mirror is disposed between the first portion and the reflector, and the reflector and the light combining element are arranged in the first direction. The diffuser is disposed at a position where the first color light and the second color light are vertically incident.

In order to make the above-mentioned features and advantages of the disclosure more comprehensible, the following embodiments are described in detail together with the accompanying drawings.

DESCRIPTION OF THE EMBODIMENTS

Figure 1:
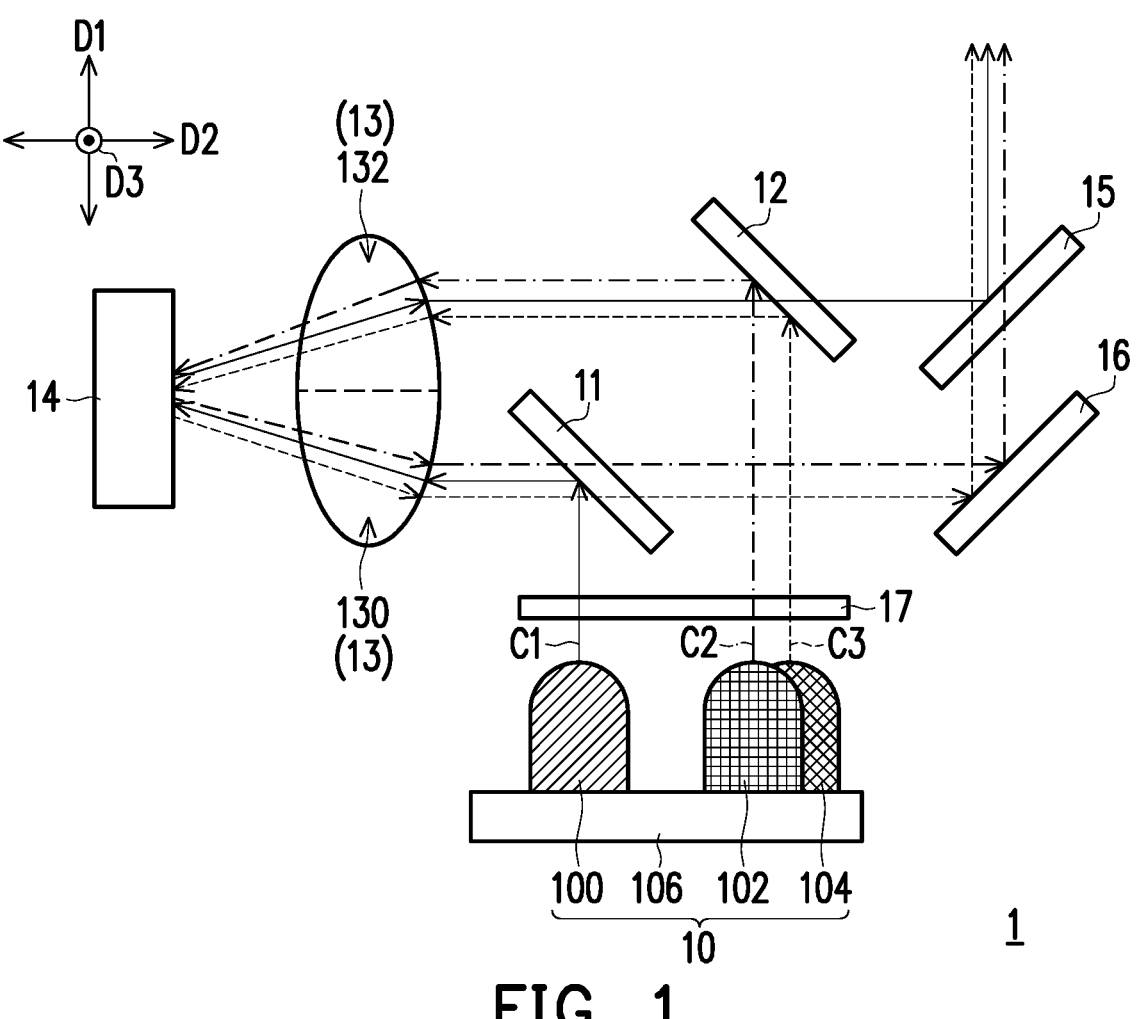
FIG. 1 and FIG. 6, FIG. 7, FIG. 8 and FIG. 9 are schematic views of light source modules according to several embodiments of the disclosure.

Directional terms mentioned in this article, such as "up," "down," "front," "back," "left," and "right," merely refer to directions in the accompanying drawings. Accordingly, the directional terms are used to illustrate rather than to limit the disclosure.

In the drawings, each of the drawings illustrates general features of methods, structures, or materials used in the particular embodiment. However, the drawings should not be interpreted as defining or limiting the scope or nature covered by the embodiments. For example, relative sizes, thicknesses, and positions of each layer, region, or structure may be reduced or enlarged for clarity.

In the following embodiments, the same or similar elements will use the same or similar reference numerals, and redundant descriptions will be omitted. In addition, features in different embodiments may be combined when no conflict is present, and simple equivalent changes and modifications made in accordance with the description or the appended claims are still within the scope of the disclosure.

Terms such as "first" and "second" mentioned in the description or the appended claims are merely used to name different elements or to distinguish different embodiments or scopes, and are not used to limit the upper or lower limit of the number of elements, nor are they used to define the order in which the elements are manufactured or disposed. Furthermore, an element/film being disposed on (or above) another element/film may include the situation that the element/film is disposed directly on (or above) the other element/film, and both elements/films are in direct contact; and the situation that the element/film is indirectly disposed on (or above) the other element/film, and there are one or more elements/films between the two elements/films.

Figure 2:
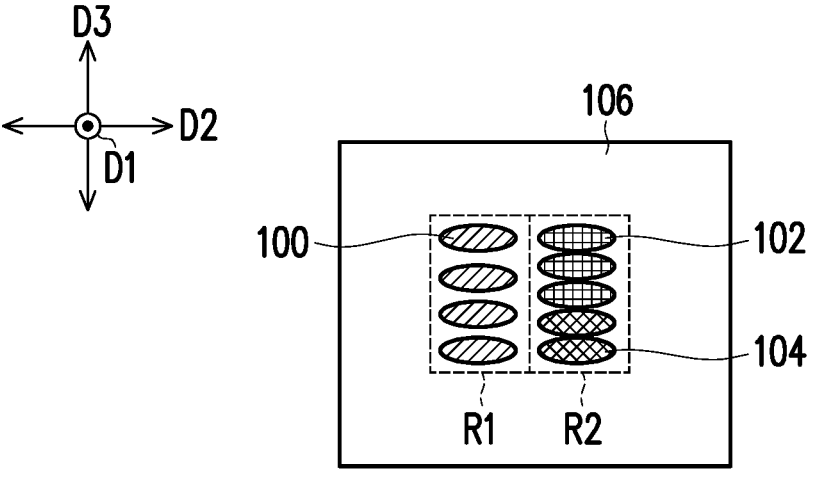
FIG. 2 is a schematic top view of a laser light source in FIG. 1.
Figure 3:
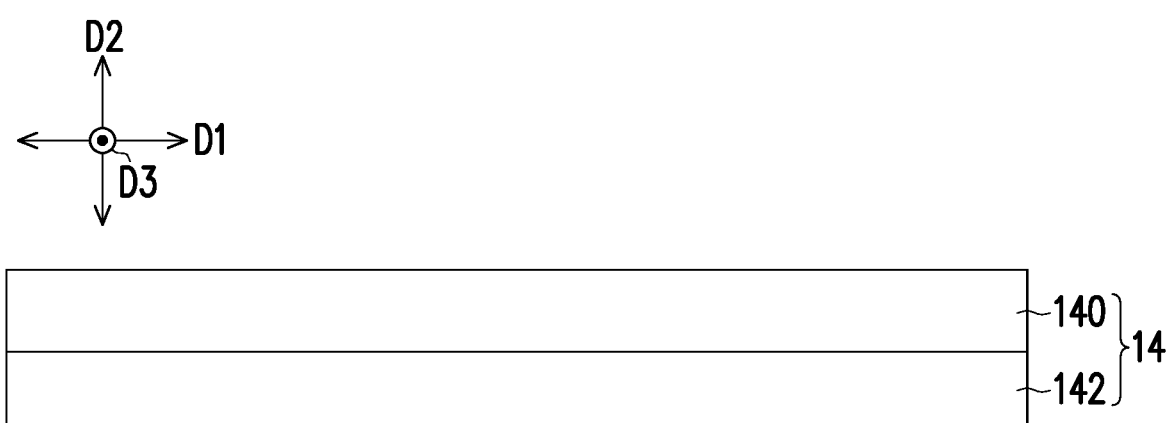
FIG. 3 is a schematic cross-sectional view of a diffuser module applicable to the embodiment in FIG. 1.
Figure 4:
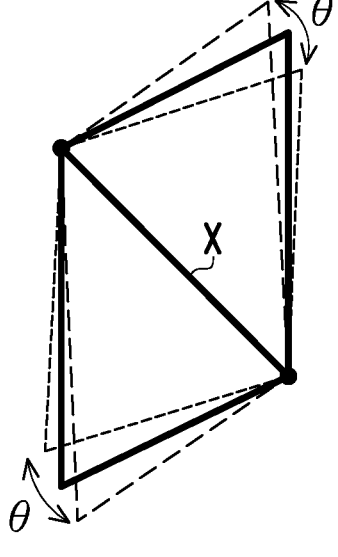
FIG. 4 is a schematic side view of another diffuser module applicable to the embodiment in FIG. 1.
Figure 5:
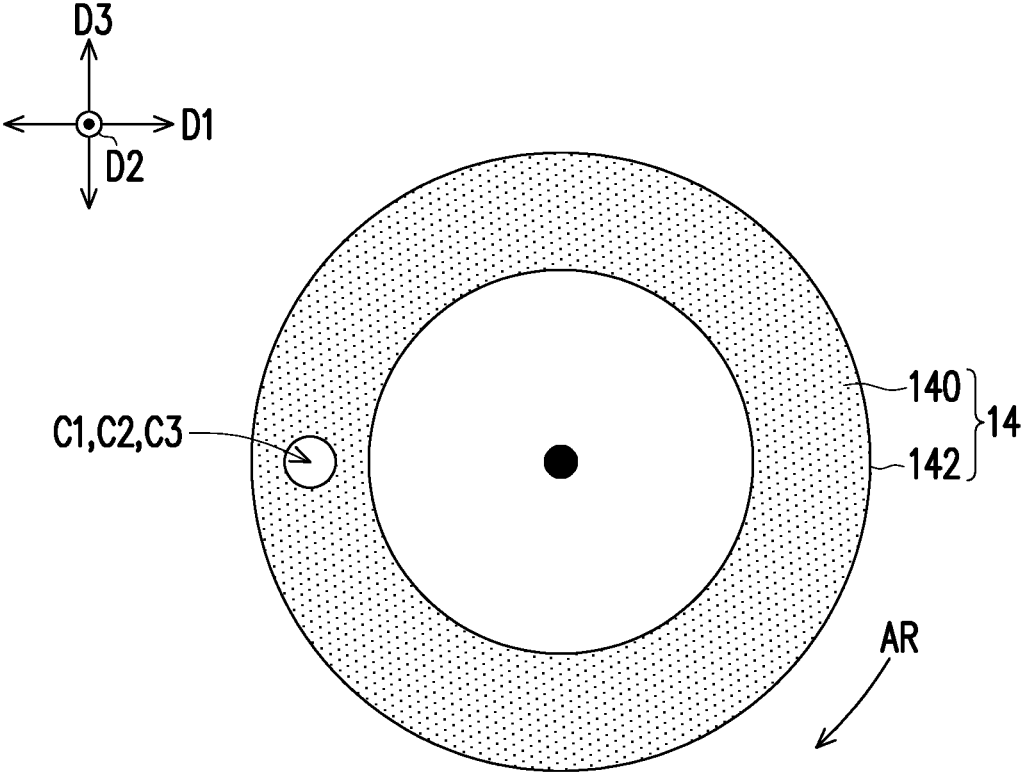
FIG. 5 is a schematic front view of still another diffuser module applicable to the embodiment in FIG. 1.
Figure 10:
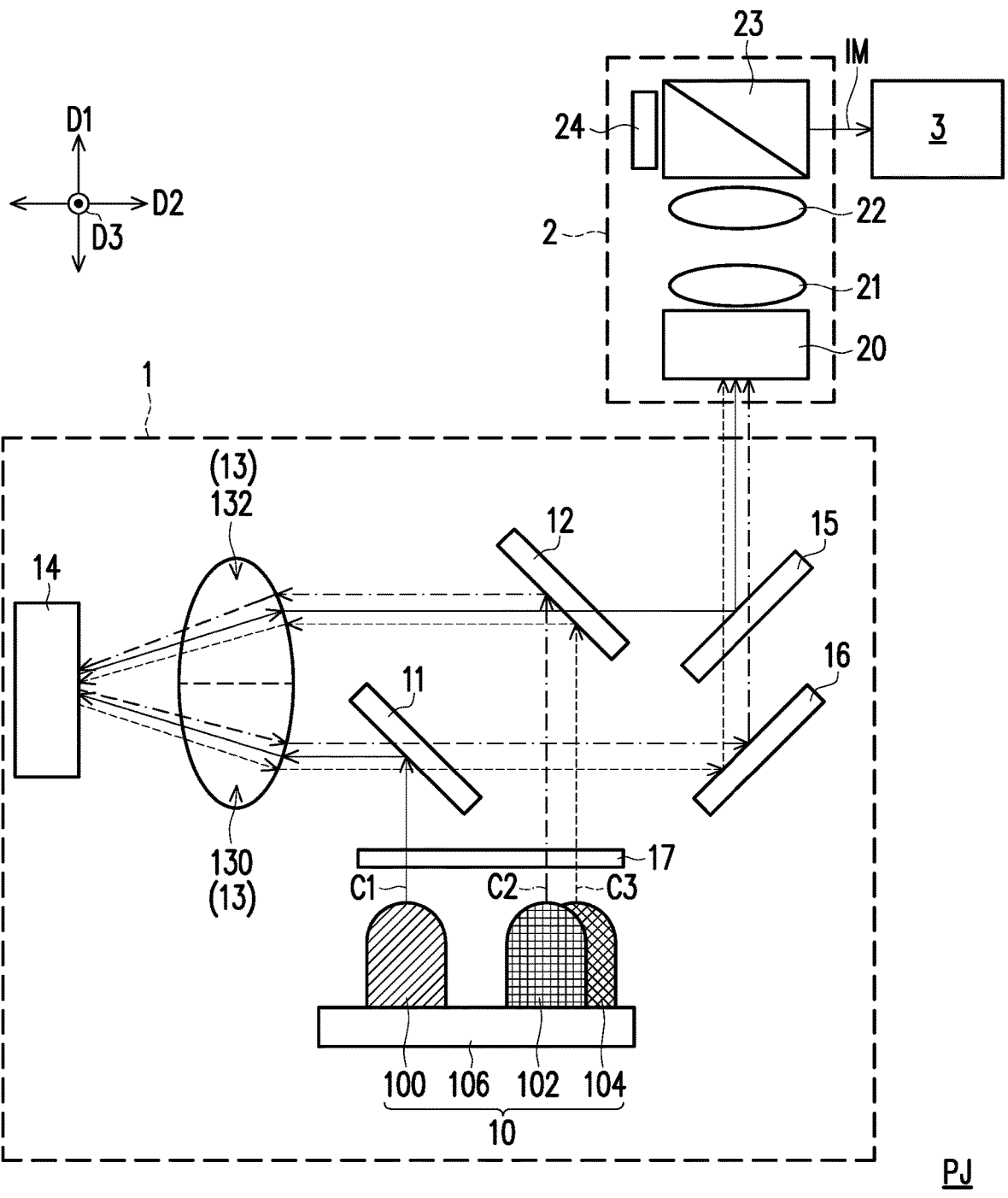
FIG. 10 and FIG. 11 are respectively schematic views of projection devices according to several embodiments of the disclosure.
Figure 11:
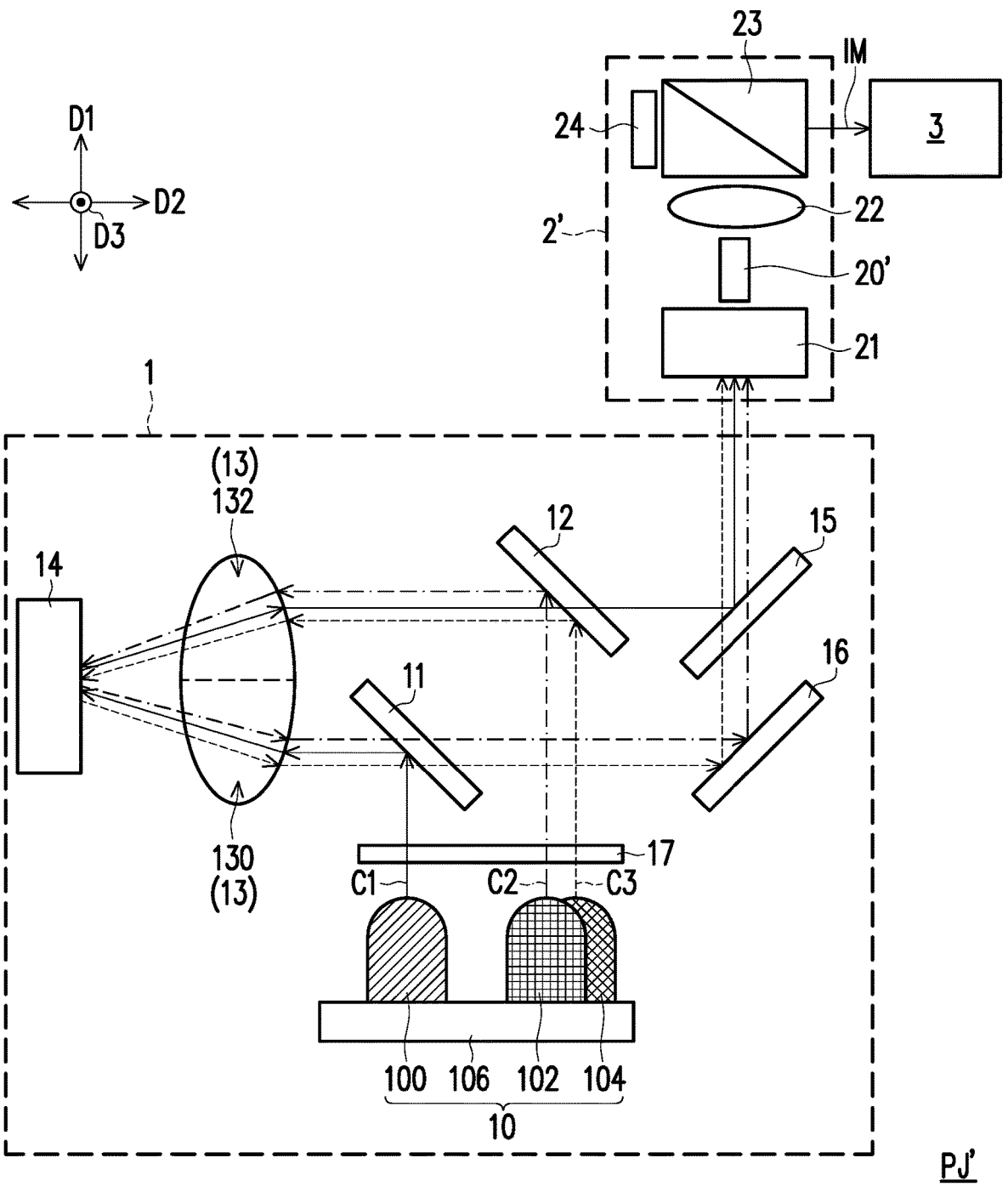

FIG. 1 and FIG. 6 to FIG. 9 are schematic views of light source modules according to several embodiments of the disclosure. FIG. 2 is a schematic top view of a laser light source in FIG. 1. FIG. 3 is a schematic cross-sectional view of a diffuser module applicable to the embodiment of FIG. 1. FIG. 4 is a schematic side view of another diffuser module applicable to the embodiment in FIG. 1. FIG. 5 is a schematic front view of still another diffuser module applicable to the embodiment in FIG. 1. FIG. 10 and FIG. 11 are respectively schematic views of projection devices according to several embodiments of the disclosure.

Please refer to FIG. 1, a light source module 1 may include a laser light source 10, a first dichroic mirror 11, a second dichroic mirror 12, a focusing lens 13, a diffuser module 14, a light combining element 15, a reflector 16, and a diffuser 17, but the disclosure is not limited thereto.

The laser light source 10 emits a first color light C1 and a second color light C2 along a first direction D1, in which the first color light C1 and the second color light C2 are arranged in a second direction D2. In other words, the first color light C1 and the second color light C2 are emitted from the laser light source 10 in parallel. The first direction D1 and the second direction D2 intersect each other. For example, the first direction D1 and the second direction D2 may be perpendicular to each other, but not limited thereto.

The first color light C1 and the second color light C2 may be different color lights. For example, the first color light C1 and the second color light C2 may be a red light and a green light respectively, but not limited thereto. The laser light source 10 may include a plurality of first laser diodes 100 configured to emit the first color light C1 (only one is schematically shown in FIG. 1) and a plurality of second laser diodes 102 configured to emit the second color light C2 (only one is schematically shown in FIG. 1).

In some embodiments, as shown in FIG. 2, the plurality of first laser diodes 100 may be arranged in a first row R1 in a third direction D3, and the plurality of second laser diodes 102 may be arranged on a side of the plurality of first laser diodes in the second direction D2 and arranged in a second row R2 in the third direction D3. The third direction D3 intersects the first direction D1 and the second direction D2. For example, the third direction D3 may be perpendicular to the first direction D1 and the second direction D2, but is not limited thereto.

In some embodiments, a plurality of laser diodes of the same color tone may have a plurality of wavelengths to enhance color rendering or improve chromatic aberration, but not limited thereto. According to different requirements, a plurality of laser diodes of the same color tone may have a single wavelength. For example, the plurality of first laser diodes 100 may have three wavelengths, and the plurality of second laser diodes 102 may have one wavelength. Taking the first color light C1 and the second color light C2 as the red light and the green light respectively as an example, the three wavelengths of the plurality of first laser diodes 100 may be 639 nm, 643 nm, and 647 nm respectively, and the wavelength of the plurality of second laser diodes 102 may be 525 nm, but the disclosure is not limited thereto.

Please refer to FIG. 1 and FIG. 2, according to different requirements or applications, the laser light source 10 may also emit a third color light C3 along the first direction D1, and the third color light C3 may have a color different from the first color light C1 and the second color light C2. In other words, the first color light C1, the second color light C2, and the third color light C3 are different color lights. For example, the first color light C1, the second color light C2, and the third color light C3 may be selected from a red light, a green light, and a blue light, but not limited thereto. The types, quantities, or relative configurations of the color lights in the laser light source 10 may be changed according to actual requirements or applications. For the convenience of description, the first color light C1, the second color light C2, and the third color light C3 are respectively the red light, the green light, and the blue light in the subsequent description.

The laser light source 10 may further include a plurality of third laser diodes 104 (only one is schematically shown in FIG. 1) configured to emit the third color light C3. In some embodiments, as shown in FIG. 2, the plurality of third laser diodes 104 and the plurality of second laser diodes 102 may be jointly arranged on a side of the plurality of first laser diodes 100 and arranged in the second row R2 in the third direction D3. The plurality of third laser diodes 104 may have one wavelength. Taking the third color light C3 as the blue light as an example, the wavelength of the plurality of third laser diodes 104 may be 465 nm, but not limited thereto.

In some embodiments, the laser light source 10 may also include a circuit board 106. The circuit board 106 carries and is electrically connected to the plurality of first laser diodes 100, the plurality of second laser diodes 102, and the plurality of third laser diodes 104. The circuit board 106 may include a printed circuit board, a flexible printed circuit board, or a glass or plastic carrying board with circuits formed thereon, but is not limited thereto.

Please refer to FIG. 1, the first dichroic mirror 11 is disposed corresponding to the first color light C1 to reflect the first color light C1, and the first dichroic mirror 11 allows the second color light C2 to pass through. Specifically, the first dichroic mirror 11 is disposed on the transmission path of the first color light C1 emitted from the laser light source 10, in which the first dichroic mirror 11 is disposed obliquely with respect to the focusing lens 13 and the laser light source 10, and the angle between the extended direction of the first dichroic mirror 11 and the first direction D1 and/or the second direction D2 is, for example, 45 degrees, so that the first color light C1 is reflected to the focusing lens 13.

The second dichroic mirror 12 is disposed corresponding to the second color light C2 to reflect the second color light C2, in which the second dichroic mirror 12 allows the first color light C1 to pass through. In detail, the second dichroic mirror 12 is disposed on the transmission path of the second color light C2 emitted by the laser light source 10, in which the second dichroic mirror 12 is disposed obliquely with respect to the focusing lens 13 and the laser light source 10, and the angle between the extended direction of the second dichroic mirror 12 and the first direction D1 and/or the second direction D2 is, for example, 45 degrees, so that the second color light C2 is reflected to the focusing lens 13.

Under the structure provided with the plurality of third laser diodes 104, the second dichroic mirror 12 may also be disposed corresponding to the third color light C3 to reflect the third color light C3, and the first dichroic mirror 11 allows the third color light C3 to pass through. Specifically, the second dichroic mirror 12 may also be disposed on the transmission path of the third color light C3 emitted by the laser light source 10, so as to reflect the third color light C3 to the focusing lens 13.

As shown in FIG. 1, the second dichroic mirror 12 is staggered with the first dichroic mirror 11 in, for example, the second direction D2. That is, the second dichroic mirror 12 and the first dichroic mirror 11 are not disposed on the same straight line parallel to the second direction D2, so that a color light reflected by the first dichroic mirror 11 (such as the first color light C1) and color lights reflected by the second dichroic mirror 12 (such as the second color light C2 and the third color light C3) are emitted to different positions/portions of the focusing lens 13 in parallel.

The focusing lens 13 is disposed on the transmission path of the color light reflected by the first dichroic mirror 11 (such as the first color light C1) and the color lights reflected by the second dichroic mirror 12 (such as the second color light C2 and the third color light C3), and the focusing lens 13 may include a first portion 130 and a second portion 132 arranged in the first direction D1, in which the first portion 130 is disposed corresponding to the first dichroic mirror 11 and is disposed between the diffuser module 14 and the first dichroic mirror 11, and the second portion 132 is disposed corresponding to the second dichroic mirror 12 and is disposed between the diffuser module 14 and the second dichroic mirror 12.

The focusing lens 13 may include a convex lens. In some embodiments, the focusing lens 13 is, for example, a collimator, and the diffuser module 14 is disposed on the focal plane of the focusing lens 13 or adjacent to the focal plane of the focusing lens 13, so that the color light (such as the first color light C1, the second color light C2, or the third color light C3) from the dichroic mirror (such as the first dichroic mirror 11 or the second dichroic mirror 12) emitted to the focusing lens 13 is converged by the focusing lens 13 to the diffuser module 14, and the color light emitted from the diffuser module 14 to the focusing lens 13 is collimated by the focusing lens 13 and is transmitted toward the dichroic mirror (such as the second dichroic mirror 12 or the first dichroic mirror 11) in the form of parallel light or approximately parallel light.

The diffuser module 14 is disposed on the transmission path of the color light (such as the first color light C1, the second color light C2, and the third color light C3) from the focusing lens 13, and the diffuser module 14 may be configured to atomize, diffuse, or uniform the color light transmitted to the diffuser module 14.

In some embodiments, as shown in FIG. 3, the diffuser module 14 may include a diffusion layer 140 and a reflective layer 142. The diffusion layer 140 may be disposed on the reflective layer 142. For example, the reflective layer 142 may be a metal plate or glass having a high reflectivity, and the diffusion layer 140 may be a metal bump formed on the reflective layer 142 through processing or a roughened surface. Alternatively, the reflective layer 142 may be a reflector, and the diffusion layer 140 may be a light-transmitting diffusion sheet formed on the reflective layer 142 through pasting or coating or a light-transmitting layer having light-scattering particles.

In other embodiments, although not shown in FIG. 3, the diffusion layer 140 may be disposed in front of the reflective layer 142 and between the reflective layer 142 and the focusing lens 13 (refer to FIG. 1). In this way, the diffusion layer 140 and the reflective layer 142 are separated from each other and may actuate independently.

In some embodiments, through the design of the diffuser module 14 moving with respect to the focusing lens 13 can improve the degree of atomization, diffusion, or uniformity of the color light, and/or improve the heat dissipation effect of the diffuser module 14. For example, under the structure that the diffusion layer 140 is disposed on the reflective layer 142, the diffusion layer 140 and the reflective layer 142 may be translated together in the first direction D1 or the third direction D3 with respect to the focusing lens 13. Taking FIG. 3 as an example, the diffusion layer 140 and the reflective layer 142 may translate back and forth in the first direction D1 (such as a horizontal direction) together; or, the diffusion layer 140 and the reflective layer 142 may translate back and forth in the third direction D3 (such as the direction of passing in through the paper and passing out through the paper). Alternatively, the movement paths of the diffusion layer 140 and the reflective layer 142 may be a rectangular frame on a reference plane formed by the first direction D1 and the third direction D3, for example, the diffusion layer 140 and the reflective layer 142 may sequentially translate along the right side in FIG. 3, translate along the direction of passing in through the paper in FIG. 3, translate along the left side in FIG. 3, and translate along the direction of passing out through the paper in FIG. 3, but not limited thereto.

On the other hand, under the structure that the diffusion layer 140 is arranged in front of the reflective layer 142, the diffusion layer 140 may be translated in the first direction D1 or the third direction D3 with respect to the focusing lens 13, and the position of the reflective layer 142 may be fixed instead of moving with respect to the focusing lens 13.

In some embodiments, through the design of the diffuser module 14 swinging with respect to the focusing lens 13 can improve the degree of atomization, diffusion, or uniformity of the color light, and/or improve the heat dissipation effect of the diffuser module 14. As shown in FIG. 4, the diffuser module 14 may include a diagonal axis X, and the diffuser module 14 may reciprocate around the diagonal axis X. Specifically, two diagonal ends connected by the diagonal axis X in the diffuser module 14 are fixed, while other two diagonal ends not connected by the diagonal axis X swing back and forth. For example, a swing angle $\theta$ of the diffuser module 14 may be within a range of plus or minus 0.3 degrees ($-0.3$ degrees$\leq\theta\leq0.3$ degrees) or within a range of plus or minus 0.2 degrees ($-0.2$ degrees$\leq\theta\leq0.2$ degrees).

In some embodiments, through the design of the diffuser module 14 rotating about the focusing lens 13 can improve the degree of atomization, diffusion, or uniformity of the color light, and/or improve the heat dissipation effect of the diffuser module 14. As shown in FIG. 5, the diffuser module 14 may be a diffuser wheel, in which the diffusion layer 140 may be arranged on the reflective layer 142, and the diffusion layer 140 and the reflective layer 142 may rotate around the second direction D2 together, for example, rotate clockwise (refer to the direction indicated by an arrow AR) or rotate counterclockwise (the opposite direction of the arrow AR).

Please refer to FIG. 1, the light combining element 15 and the second portion 132 of the focusing lens 13 are respectively positioned on opposite sides of the second dichroic mirror 12, that is, the second dichroic mirror 12 is disposed between the second portion 132 and the light combining element 15. The light combining element 15 may be used to reflect at least a portion of the first color light C1 and allow at least a portion of the second color light C2 and at least a portion of the third color light C3 to pass through. In some embodiments, as shown in FIG. 1, the light combining element 15 may be a dichroic mirror, but not limited thereto. In other embodiments, the light combining element 15 may be a partially transmissive partially reflective element. In addition, the light combining element 15 may have an oblique direction opposite to the second dichroic mirror 12, so that the color light incident on the second dichroic mirror 12 along the second direction D2 is diverted and emitted from the light source module 1 along the first direction D1.

The reflector 16 and the first portion 130 of the focusing lens 13 are respectively positioned on opposite sides of the first dichroic mirror 11, that is, the first dichroic mirror 11 is disposed between the first portion 130 and the reflector 16. In addition, the reflector 16 and the light combining element 15 are arranged in the first direction D1, so that the light combining element 15 may receive the color light (such as the second color light C2 and the third color light C3) reflected by the reflector 16. In addition, the reflector 16 may have an oblique direction opposite to the first dichroic mirror 11, so that the color light incident on the reflector 16 along the second direction D2 is diverted and transmitted to the light combining element 15 along the first direction D1.

The diffuser 17 is disposed at a position where the first color light C1 and the second color light C2 are vertically incident. Under the structure that the laser light source 10 also emits the third color light C3, the diffuser 17 is also disposed at a position where the third color light C3 is vertically incident. Taking FIG. 1 as an example, the diffuser 17 may be disposed between the laser light source 10 and the first dichroic mirror 11 and between the laser light source 10 and the second dichroic mirror 12, but is not limited thereto.

In FIG. 1, the first color light C1 emitted by the laser light source 10 sequentially passes through the diffuser 17, is reflected by the first dichroic mirror 11 to the first portion 130 of the focusing lens 13, is refracted by the first portion 130 of the focusing lens 13 to the diffuser module 14, is reflected by the diffuser module 14 to the second portion 132 of the focusing lens 13, is refracted by the second portion 132 of the focusing lens 13 to the second dichroic mirror 12, passes through the second dichroic mirror 12 and is reflected by the light combining element 15. In addition, each of the second color light C2 and the third color light C3 emitted by the laser light source 10 sequentially passes through the diffuser 17, is reflected by the second dichroic mirror 12 to the second portion 132 of the focusing lens 13, is refracted by the second portion 132 of the focusing lens 13 to the diffuser module 14, is reflected by the diffuser module 14 to the first portion 130 of the focusing lens 13, is refracted by the first portion 130 of the focusing lens 13 to the first dichroic mirror 11, passes through the first dichroic mirror 11, is reflected by the reflector 16 to the light combining element 15, and passes through the light combining element 15.

Through the diffuser module 14 improving the degree of atomization, diffusion, or uniformity for large-angle incident light, and through the diffuser 17 improving the degree of atomization, diffusion, or uniformity of color light for vertical incident light, which can effectively improve the problem of light spots. In addition, through the optical path design, different color lights are integrated and output together, which can improve the color uniformity. Therefore, an electronic device (such as a projection device) using the light source module 1 can provide an image screen with uniform color.

Figures 6, 7:
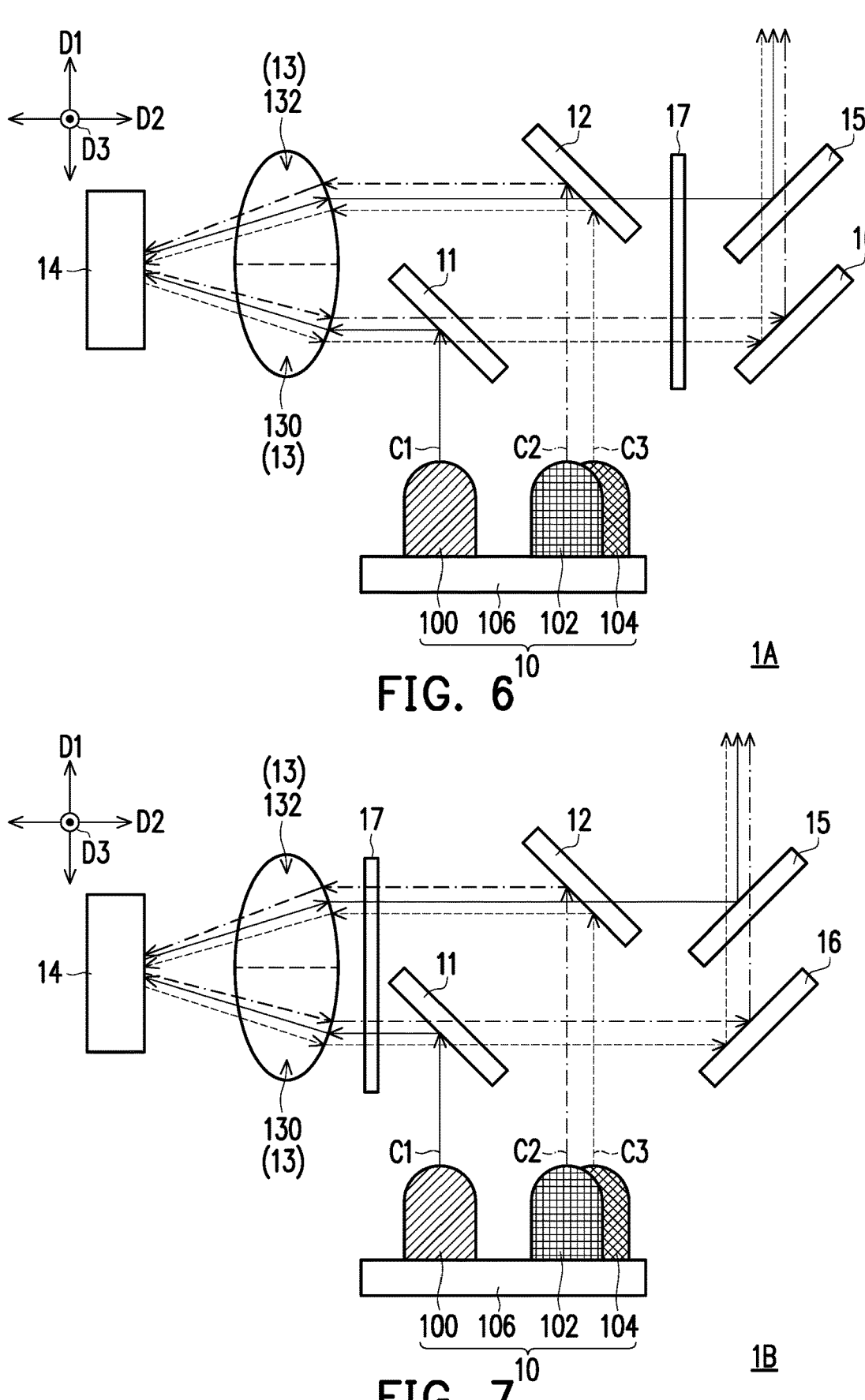

Please refer to FIG. 6, the main difference between a light source module 1A and the light source module 1 in FIG. 1 is that the diffuser 17 in FIG. 6 is disposed between the reflector 16 and the first dichroic mirror 11 and between the light combining element 15 and the second dichroic mirror 12. The position of the diffuser 17 in any embodiment of the disclosure may be changed accordingly, and will not be repeated below.

Please refer to FIG. 7, the main difference between a light source module 1B and the light source module 1 in FIG. 1 is that the diffuser 17 in FIG. 7 is disposed between the focusing lens 13 and the first dichroic mirror 11 and between the focusing lens 13 and the second dichroic mirror 12. The position of the diffuser 17 in any embodiment of the disclosure may be changed accordingly, and will not be repeated below.

Figures 8, 9:
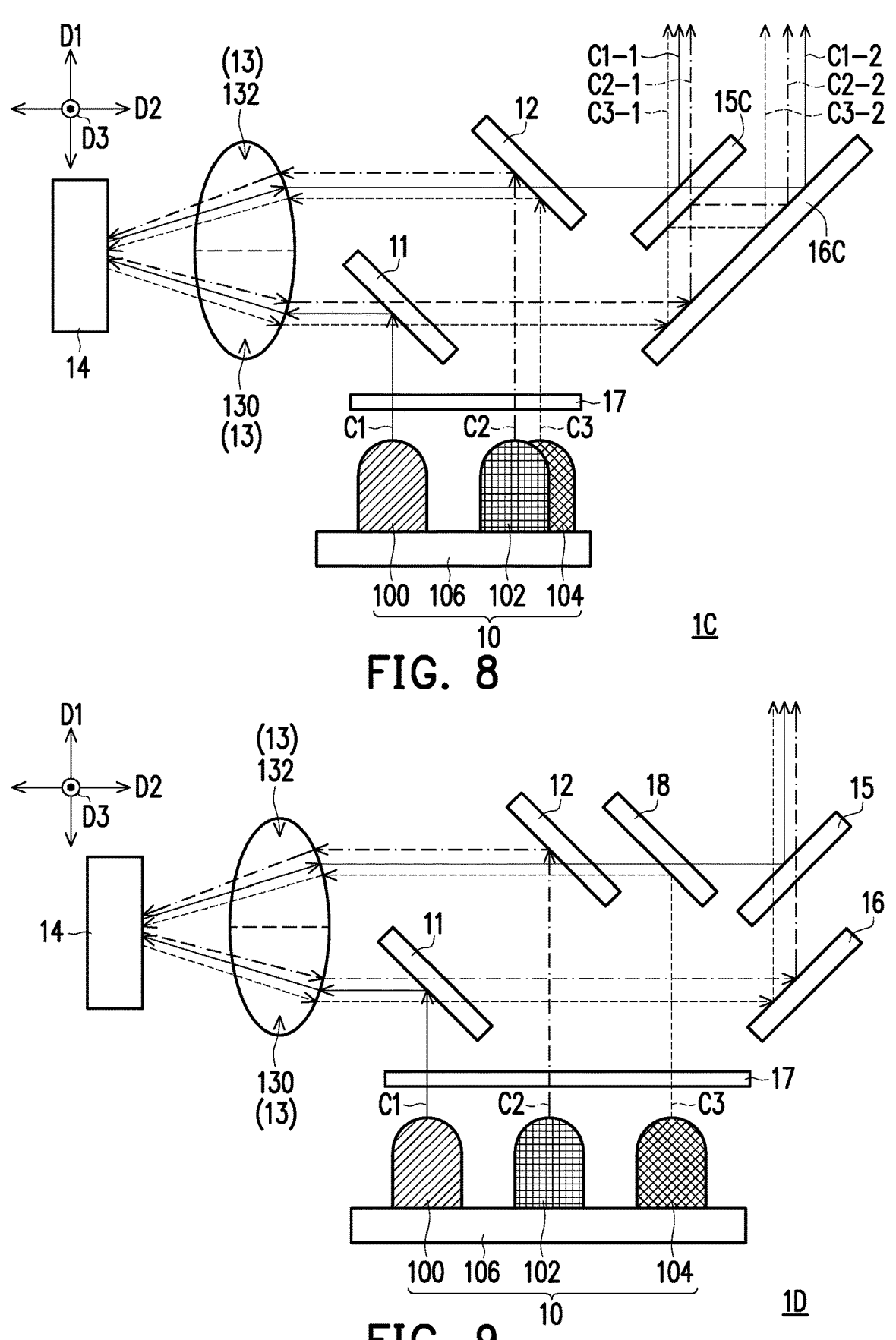

Please refer to FIG. 8, the main difference between a light source module 1C and the light source module 1 in FIG. 1 is that a light combining element 15C in FIG. 8 is a partially transmissive partially reflective element, and the light combining element 15C is disposed between the second dichroic mirror 12 and a reflector 16C along the second direction D2.

In FIG. 8, the first color light C1 emitted by the laser light source 10 sequentially passes through the diffuser 17, is reflected by the first dichroic mirror 11 to the first portion 130 of the focusing lens 13, is refracted by the first portion 130 of the focusing lens 13 to the diffuser module 14, is reflected by the diffuser module 14 to the second portion 132 of the focusing lens 13, is refracted by the second portion 132 of the focusing lens 13 to the second dichroic mirror 12, passes through the second dichroic mirror 12 to the light combining element 15C, the light combining element 15C reflects a first portion C1-1 of the first color light C1 and allows a second portion C1-2 of the first color light C1 to pass through, and the second portion C1-2 of the first color light C1 that passes through the light combining element 15C is then reflected by the reflector 16C. In addition, each of the second color light C2 and the third color light C3 emitted by the laser light source 10 sequentially passes through the diffuser 17, is reflected by the second dichroic mirror 12 to the second portion 132 of the focusing lens 13, is refracted by the second portion 132 of the focusing lens 13 to the diffuser module 14, is reflected by the diffuser module 14 to the first portion 130 of the focusing lens 13, is refracted by the first portion 130 of the focusing lens 13 to the first dichroic mirror 11, passes through the first dichroic mirror 11 and is reflected to the light combining element 15C by the reflector 16C, the light combining element 15C allows a third portion C2-1 of the second color light C2 to pass through and reflects a fourth portion C2-2 of the second color light C2, the light combining element 15C also allows a fifth portion C3-1 of the third color light C3 to pass through and reflect a sixth portion C3-2 of the third color light C3, and the fourth portion C2-2 of the second color light C2 reflected by the light combining element 15C and the sixth portion C3-2 of the third color light C3 are then reflected by the reflector 16C.

The light combining element 15C adopts the design of partially transmissive partially reflective element, which can expand the light beam or further improve the uniformity of color.

Please refer to FIG. 9, the main difference between a light source module 1D and the light source module 1 in FIG. 1 is described below. In the light source module 1D, the plurality of third laser diodes 104 (only one is schematically shown in FIG. 9) are arranged in a third row R3 in the third direction D3, and the second row R2 is positioned between the first row R1 and the third row R3 in the second direction D2. In addition, the light source module 1D also includes a third dichroic mirror 18, in which the third dichroic mirror 18 and the second dichroic mirror 12 are arranged in the second direction D2 and disposed corresponding to the third color light C3. The third dichroic mirror 18 reflects the third color light C3 and allows the first color light C1 to pass through. The second dichroic mirror 12 allows the third color light C3 to pass through. The first dichroic mirror 11 allows the third color light C3 to pass through. The light combining element 15 allows at least a portion of the third color light C3 to pass through.

In FIG. 9, the first color light C1 emitted by the laser light source 10 sequentially passes through the diffuser 17, is reflected by the first dichroic mirror 11 to the first portion 130 of the focusing lens 13, is refracted by the first portion 130 of the focusing lens 13 to the diffuser module 14, is reflected by the diffuser module 14 to the second portion 132 of the focusing lens 13, is refracted by the second portion 132 of the focusing lens 13 to the second dichroic mirror 12, passes through the second dichroic mirror 12, passes through the third dichroic mirror 18, and is reflected by the light combining element 15. In addition, the second color light C2 emitted by the laser light source 10 sequentially passes through the diffuser 17, is reflected by the second dichroic mirror 12 to the second portion 132 of the focusing lens 13, is refracted by the second portion 132 of the focusing lens 13 to the diffuser module 14, is reflected by the diffuser module 14 to the first portion 130 of the focusing lens 13, is refracted by the first portion 130 of the focusing lens 13 to the first dichroic mirror 11, passes through the first dichroic mirror 11, is reflected by the reflector 16 to the light combining element 15, and passes through the light combining element 15. In addition, the third color light C3 emitted by the laser light source 10 sequentially passes through the diffuser 17, is reflected by the third dichroic mirror 18 to the second dichroic mirror 12, passes through the second dichroic mirror 12 and is transmitted to the second portion 132 of the focusing lens 13, is refracted by the second portion 132 of the focusing lens 13 to the diffuser module 14, is reflected by the diffuser module 14 to the first portion 130 of the focusing lens 13, is refracted by the first portion 130 of the focusing lens 13 to the first dichroic mirror 11, passes through the first dichroic mirror 11, is reflected to the light combining element 15 by the reflector 16, and passes through the light combining element 15.

In addition, although not shown, the diffuser 17 may be changed to be disposed between the reflector 16 and the first dichroic mirror 11 and between the light combining element 15 and the third dichroic mirror 18 (refer to FIG. 6). Alternatively, the diffuser 17 may be changed to be disposed between the focusing lens 13 and the first dichroic mirror 11 and between the focusing lens 13 and the second dichroic mirror 12 (refer to FIG. 7). Furthermore, the light combining element 15 and the reflector 16 in FIG. 9 may also be replaced with the light combining element 15C and the reflector 16C in FIG. 8.

Referring to FIG. 10, a projection device PJ may include the light source module 1, an illumination module 2, and an imaging module 3. The illumination module 2 is disposed on the transmission path of color lights (including the first color light C1, the second color light C2, and the third color light C3) output by the light source module 1 and converts the color lights into an image light IM including image information. The imaging module 3 is disposed on the transmission path of the image light IM and can project the image light IM onto an imageable element (such as a curtain or a wall).

In some embodiments, the illumination module 2 may include a light uniformity element 20, a convex lens 21, a relay lens 22, a light transmitting element 23, and a light valve 24. The light uniformity element 20, the convex lens 21, the relay lens 22, and the light transmitting element 23 are sequentially disposed on the transmission path of the color light (including the first color light C1, the second color light C2, and the third color light C3) output by the light source module 1, and the light transmitting element 23 is disposed between the light valve 24 and the imaging module 3. The light uniformity element 20 is configured to uniform the color light. The light transmitting element 23 is configured to reflect the color light (including the first color light C1, the second color light C2, and the third color light C3) to the light valve 24. The light valve 24 is configured to convert the color light into the image light IM and reflect the image light IM to the light transmitting element 23. The light transmitting element 23 allows the image light IM to pass through to the imaging module 3. For example, the light uniformity element 20 may include a fly eye lens; the light transmitting element 23 may include a total internal reflection (TIR) lens; the light valve 24 may include a digital micro-mirror device (DMD), a liquid-crystal-on-silicon panel (LCOS panel), or other suitable spatial light modulators (SLM); the imaging module 3 may include one or more lenses, but is not limited thereto.

In other embodiments, although not shown, the light source module 1 in FIG. 10 may be replaced with the light source module of any of the above-mentioned embodiments.

Please refer to FIG. 11, the main difference between a projection device PJ' and the projection device PJ in FIG. 10 lies in the types and relative disposed positions of components in an illumination module 2'. Specifically, in the illumination module 2', the positions of a light uniformity element 20' and the convex lens 21 are reversed, and the light uniformity element 20' is, for example, a light integrating column.

In other embodiments, although not shown, the light source module 1 in FIG. 11 can also be replaced with the light source module of any of the above-mentioned embodiments.

In summary, in the embodiment of the disclosure, through the diffuser module improving the degree of atomization, diffusion, or uniformity for large-angle incident light, and through the diffuser improving the degree of atomization, diffusion, or uniformity of color light for vertical incident light, which can effectively improve the problem of light spots. In addition, through the optical path design, different color lights are integrated and output together, which can improve the color uniformity. Therefore, the electronic device using the light source module can provide an image screen with uniform color.

Although the disclosure has been disclosed above with the embodiments, the embodiments are not intended to limit the disclosure. Persons with ordinary knowledge in the technical field may make some changes and modifications without departing from the spirit and scope of the disclosure. The scope of protection of the disclosure should be defined by the scope of the appended claims.

What is claimed is:

1. A light source module, comprising:
a laser light source emitting a first color light and a second color light along a first direction, wherein the first color light and the second color light are arranged in a second direction;
a first dichroic mirror disposed corresponding to the first color light to reflect the first color light, wherein the first dichroic mirror allows the second color light to pass through;
a second dichroic mirror staggered with the first dichroic mirror in the second direction and disposed corresponding to the second color light to reflect the second color light, wherein the second dichroic mirror allows the first color light to pass through;
a focusing lens comprising a first portion and a second portion arranged in the first direction, wherein the first portion is disposed corresponding to the first dichroic mirror, and the second portion is disposed corresponding to the second dichroic mirror;

a diffuser module, wherein the first portion is disposed between the diffuser module and the first dichroic mirror, and the second portion is disposed between the diffuser module and the second dichroic mirror;

a light combining element, wherein the second dichroic mirror is disposed between the second portion and the light combining element, and the light combining element reflects at least a portion of the first color light and allows at least a portion of the second color light to pass through;

a reflector, wherein the first dichroic mirror is disposed between the first portion and the reflector, and the reflector and the light combining element are arranged in the first direction; and a diffuser disposed at a position where the first color light and the second color light are vertically incident.

2. The light source module as claimed in claim 1, wherein the diffuser is disposed between the laser light source and the first dichroic mirror and between the laser light source and the second dichroic mirror.

3. The light source module as claimed in claim 1, wherein the diffuser is disposed between the reflector and the first dichroic mirror and between the light combining element and the second dichroic mirror.

4. The light source module as claimed in claim 1, wherein the diffuser is disposed between the focusing lens and the first dichroic mirror and between the focusing lens and the second dichroic mirror.

5. The light source module as claimed in claim 1, wherein the light combining element is a dichroic mirror, wherein the first color light is sequentially reflected by the first dichroic mirror to the first portion of the focusing lens, is refracted by the first portion of the focusing lens to the diffuser module, is reflected by the diffuser module to the second portion of the focusing lens, is refracted by the second portion of the focusing lens to the second dichroic mirror, passes through the second dichroic mirror, and is reflected by the light combining element, and the second color light is sequentially reflected by the second dichroic mirror to the second portion of the focusing lens, is refracted by the second portion of the focusing lens to the diffuser module, is reflected by the diffuser module to the first portion of the focusing lens, is refracted by the first portion of the focusing lens to the first dichroic mirror, passes through the first dichroic mirror, is reflected by the reflector to the light combining element, and passes through the light combining element.

6. The light source module as claimed in claim 1, wherein the light combining element is a partially transmissive partially reflective element, and the light combining element is disposed between the second dichroic mirror and the reflector in the second direction, wherein the first color light is sequentially reflected by the first dichroic mirror to the first portion of the focusing lens, is refracted by the first portion of the focusing lens to the diffuser module, is reflected by the diffuser module to the second portion of the focusing lens, is refracted by the second portion of the focusing lens to the second dichroic mirror, passes through the second dichroic mirror to the light combining element, the light combining element reflects a first portion of the first color light and allows a second portion of the first color light to pass through, and the second portion of the first color light that passes through the light combining element is then reflected by the reflector, and the second color light is sequentially reflected by the second dichroic mirror to the second portion of the focusing lens, is refracted by the second portion of the focusing lens to the diffuser module, is reflected by the diffuser module to the first portion of the focusing lens, is refracted by the first portion of the focusing lens to the first dichroic mirror, passes through the first dichroic mirror and is reflected to the light combining element by the reflector, the light combining element allows a third portion of the second color light to pass through and reflects a fourth portion of the second color light, and the fourth portion of the second color light reflected by the light combining element is then reflected by the reflector.

7. The light source module as claimed in claim 1, wherein the first color light and the second color light are different color lights, the laser light source comprises a plurality of first laser diodes emitting the first color light and a plurality of second laser diodes emitting the second color light, the plurality of first laser diodes are arranged in a first row in a third direction, and the plurality of second laser diodes are arranged on a side of the plurality of first laser diodes in the second direction and arranged in a second row in the third direction.

8. The light source module as claimed in claim 7, wherein the laser light source further emits a third color light, the first color light, the second color light, and the third color light are different color lights, the second dichroic mirror is further disposed corresponding to the third color light and reflects the third color light, the first dichroic mirror allows the third color light to pass through, and the light combining element allows at least a portion of the third color light to pass through.

9. The light source module as claimed in claim 8, wherein the laser light source further comprises a plurality of third laser diodes emitting the third color light, the plurality of third laser diodes and the plurality of second laser diodes are jointly arranged on a side of the plurality of first laser diodes and arranged in the second row in the third direction.

10. The light source module as claimed in claim 9, wherein the plurality of first laser diodes have three wavelengths, the plurality of second laser diodes have one wavelength, and the plurality of third laser diodes have one wavelength.

11. The light source module as claimed in claim 7, wherein the laser light source further emits a third color light, the first color light, the second color light, and the third color light are different color lights, and the light source module further comprises:

a third dichroic mirror arranged with the second dichroic mirror in the second direction and disposed corresponding to the third color light, wherein the third dichroic mirror reflects the third color light and allows the first color light to pass through, the second dichroic mirror allows the third color light to pass through, the first dichroic mirror allows the third color light to pass through, and the light combining element allows at least a portion of the third color light to pass through.

12. The light source module as claimed in claim 11, wherein the laser light source further comprises a plurality of third laser diodes emitting the third color light, the plurality of third laser diodes are arranged in a third row in the third direction, and the second row is positioned between the first row and the third row in the second direction.

13. The light source module as claimed in claim 1, wherein the diffuser module comprises a diffusion layer and a reflective layer, and the diffusion layer is disposed on the reflective layer or in front of the reflective layer.

14. The light source module as claimed in claim 13, wherein the diffusion layer is translated in the first direction or the third direction with respect to the focusing lens, or the diffusion layer and the reflective layer are translated together in the first direction or the third direction with respect to the focusing lens.

15. The light source module as claimed in claim 13, wherein the diffusion layer is disposed on the reflective layer, and the diffusion layer and the reflective layer rotate around the second direction together.

16. The light source module as claimed in claim 13, wherein the diffuser module comprises a diagonal axis, and the diffuser module reciprocates around the diagonal axis.

17. The light source module as claimed in claim 1, wherein the focusing lens is a collimator.

\* \* \* \* \*